(12) United States Patent
Ferreira Lima et al.

(10) Patent No.: US 12,045,270 B2
(45) Date of Patent: Jul. 23, 2024

(54) RETRIEVING DOCUMENTS ACCORDING TO TEMPORAL SIMILARITY

(71) Applicant: International Business Machines Corporation, Armonk, NY (US)

(72) Inventors: Guilherme Augusto Ferreira Lima, Campinas (BR); Rafael Rossi de Mello Brandao, Rio de Janeiro (BR); Marcio Ferreira Moreno, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 17/383,789

(22) Filed: Jul. 23, 2021

(65) Prior Publication Data

US 2023/0033211 A1 Feb. 2, 2023

(51) Int. Cl.
*G06F 40/30* (2020.01)
*G06F 16/33* (2019.01)
(Continued)

(52) U.S. Cl.
CPC ........ *G06F 16/3344* (2019.01); *G06F 40/295* (2020.01); *G06F 40/30* (2020.01); *G06F 40/40* (2020.01); *G06N 5/02* (2013.01)

(58) Field of Classification Search
CPC ........ G06F 40/30; G06F 40/00; G06F 40/103; G06F 40/12; G06F 40/131; G06F 40/14; G06F 40/151; G06F 40/154; G06F 40/16; G06F 40/194; G06F 40/20; G06F 40/205; G06F 40/216; G06F 40/279; G06F 40/295

(Continued)

(56) References Cited

U.S. PATENT DOCUMENTS 9,430,570 B2   8/2016   Button et al.
10,042,894 B2  8/2018   Xu et al.
(Continued)

OTHER PUBLICATIONS

Ceroni, A., et al.; "Bridging Temporal Context Gaps Using Time-Aware Re-Contextualization", SIGIR'14, Jul. 6-11, 2014, 4 pages.
(Continued)

*Primary Examiner* — Qi Han
(74) *Attorney, Agent, or Firm* — Scully, Scott, Murphy & Presser, P.C.; Anthony Mauricio Pallone

(57) ABSTRACT

Entities and temporal information associated with the entities can be extracted from the documents using natural language processing. A graph structure can be created representing the document's temporal semantics, nodes of the graph structure including the entities and edges of the graph structure representing temporal relationships between the nodes. The graph structure can be linked with the document. Multiple documents can be received and a knowledgebase can be created including multiple graph structures representing the multiple documents according to the multiple documents' temporal semantics. An input document for query can be received and transformed into a graph structure for query, the graph structure for query representing the input document's temporal semantics. The knowledgebase can be searched for a matching document having a graph structure similar to the graph structure for query based on a similarity threshold. The matching document can be output.

18 Claims, 13 Drawing Sheets

(51) Int. Cl.
*G06F 40/295* (2020.01)
*G06F 40/40* (2020.01)
*G06N 5/02* (2023.01)

(58) Field of Classification Search
USPC .................................. 704/9, 1, 5, 7, 10, 257
See application file for complete search history.

(56) References Cited

U.S. PATENT DOCUMENTS

| | | | |
|---|---|---|---|
| 10,296,823 B2 | 5/2019 | Hofmann et al. | |
| 10,353,967 B2 | 7/2019 | Dumais et al. | |
| 10,503,762 B2 | 12/2019 | Franceschini et al. | |
| 10,628,453 B1 | 4/2020 | Navrides et al. | |
| 10,635,690 B1 | 4/2020 | Blackwell, Jr. et al. | |
| 10,698,886 B2 | 6/2020 | Gross | |
| 10,762,080 B2 | 9/2020 | Gross | |
| 2012/0109637 A1 | 5/2012 | Merugu et al. | |
| 2017/0083507 A1* | 3/2017 | Ho | G06Q 30/0203 |
| 2017/0124158 A1 | 5/2017 | Mirhaji | |
| 2018/0082197 A1* | 3/2018 | Aravamudan | G16B 50/10 |
| 2018/0173792 A1 | 6/2018 | Kesin | |
| 2018/0232443 A1 | 8/2018 | Delgo et al. | |
| 2018/0286081 A1 | 10/2018 | Koperski et al. | |
| 2019/0108224 A1* | 4/2019 | Boxwell | G06F 16/288 |
| 2020/0250188 A1 | 8/2020 | McCracken et al. | |
| 2020/0322361 A1 | 10/2020 | Ravindra et al. | |
| 2020/0410292 A1 | 12/2020 | Trim et al. | |
| 2021/0042394 A1 | 2/2021 | Puranic et al. | |

OTHER PUBLICATIONS

Stilo, G., et al., "Time Makes Sense: Event Discovery in Twitter Using Temporal Similarity", IEEE/WIC/ACM International Joint Conference on Web Intelligence (WI) and Intelligent Agent Technologies (IAT), Aug. 2014, pp. 186-193.

Majdoubi, J., et al., "Exploiting Temporal Information in Documents and Query to Improve the Information Retrieval Process: Application to Medical Articles", (IJACSA) International Journal of Advanced Computer Science and Applications 2017, Aug. 31, 2017, pp. 432-440, vol. 8, No. 8.

Lakumarapu, S., et al., "Temporal Information Based Organizing of Multimedia Archives", International Journal of Applied Engineering Research (2018), May 2018, pp. 3074-3082, vol. 13, No. 5.

Candan, K.S., et al.; "Similarity-Based Retrieval of Temporal Specifications and its Application to the Retrieval of Multimedia Documents", Multimedia Tools And Applications, Sep. 2005, pp. 1-34, vol. 27, Iss. 1.

Huang, J., et al., "CoRel: Seed-Guided Topical Taxonomy Construction by Concept Learning and Relation Transferring", Proceedings of the 26th ACM SIGKDD Conference on Knowledge Discovery and Data Mining (KDD 20), Aug. 23-27, 2020, pp. 1928-1936.

Li, M., et al., "Cross-media Structured Common Space for Multimedia Event Extraction", Proceedings of the 58th Annual Meeting of the Association for Computational Linguistics, Jul. 5-10, 2020, pp. 2557-2568.

Wei, C.-P., et al., "Discovering Event Evolution Patterns From Document Sequences", IEEE Transactions on Systems, Man, and Cybernetics—Part A: Systems and Humans, Mar. 2007, pp. 273-283, vol. 37, No. 2.

Ferreira Moreno, M., et al., "Extending Hypermedia Conceptual Models to Support Hyperknowledge Specifications", https://doi.org/10.1142/S1793351X17400037, Accessed on Aug. 22, 2018, International Journal of Semantic Computing, (2017), pp. 43-64, vol. 11, No. 1.

Allen, J.F., "Maintaining Knowledge about Temporal Intervals", https://doi.org/10.1145%2F182.358434, Accessed on Jul. 23, 2021, Communications of the ACM, Nov. 1983, pp. 832-843, vol. 26, Issue 11.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

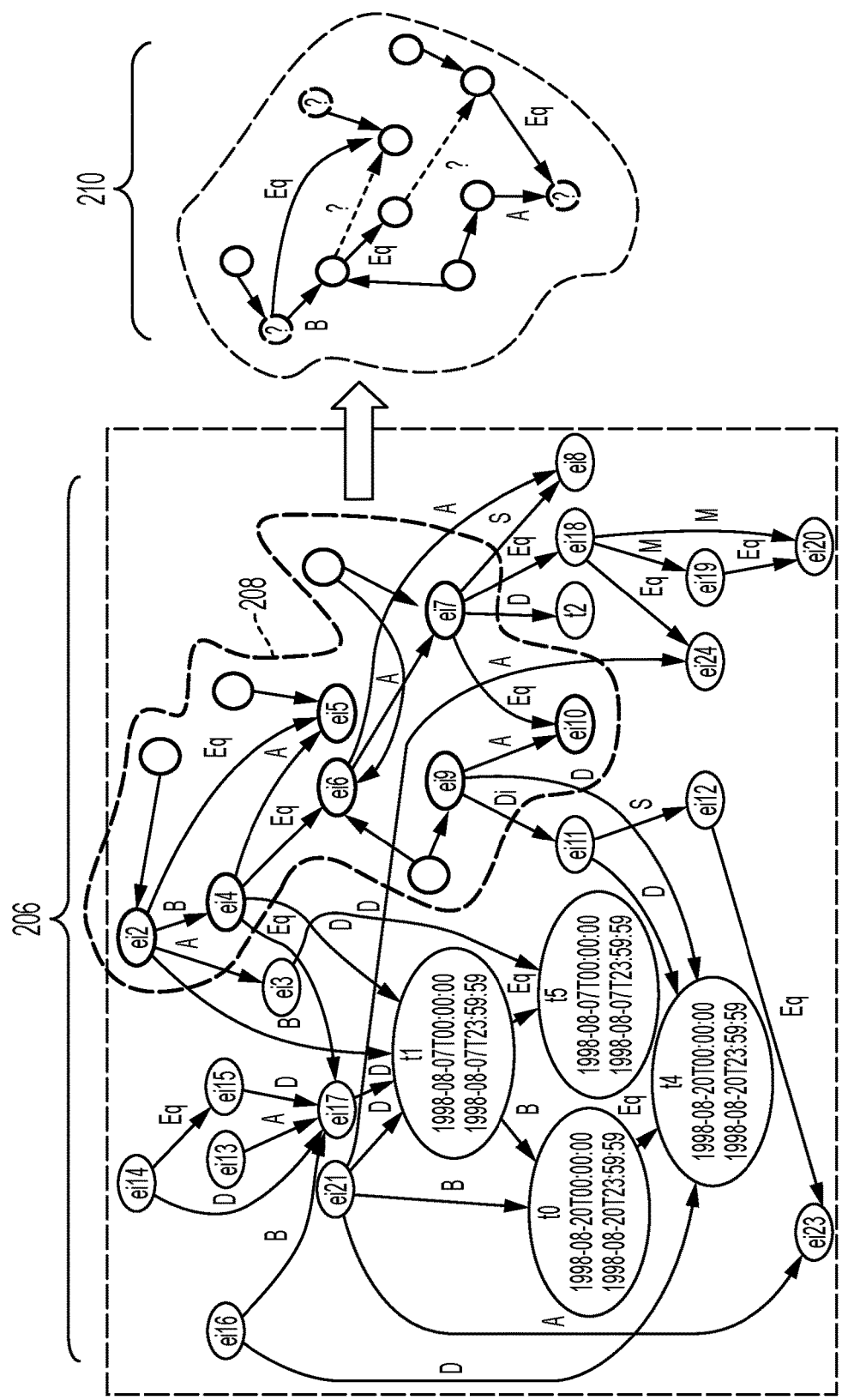
FIG. 2 (Cont.-1)

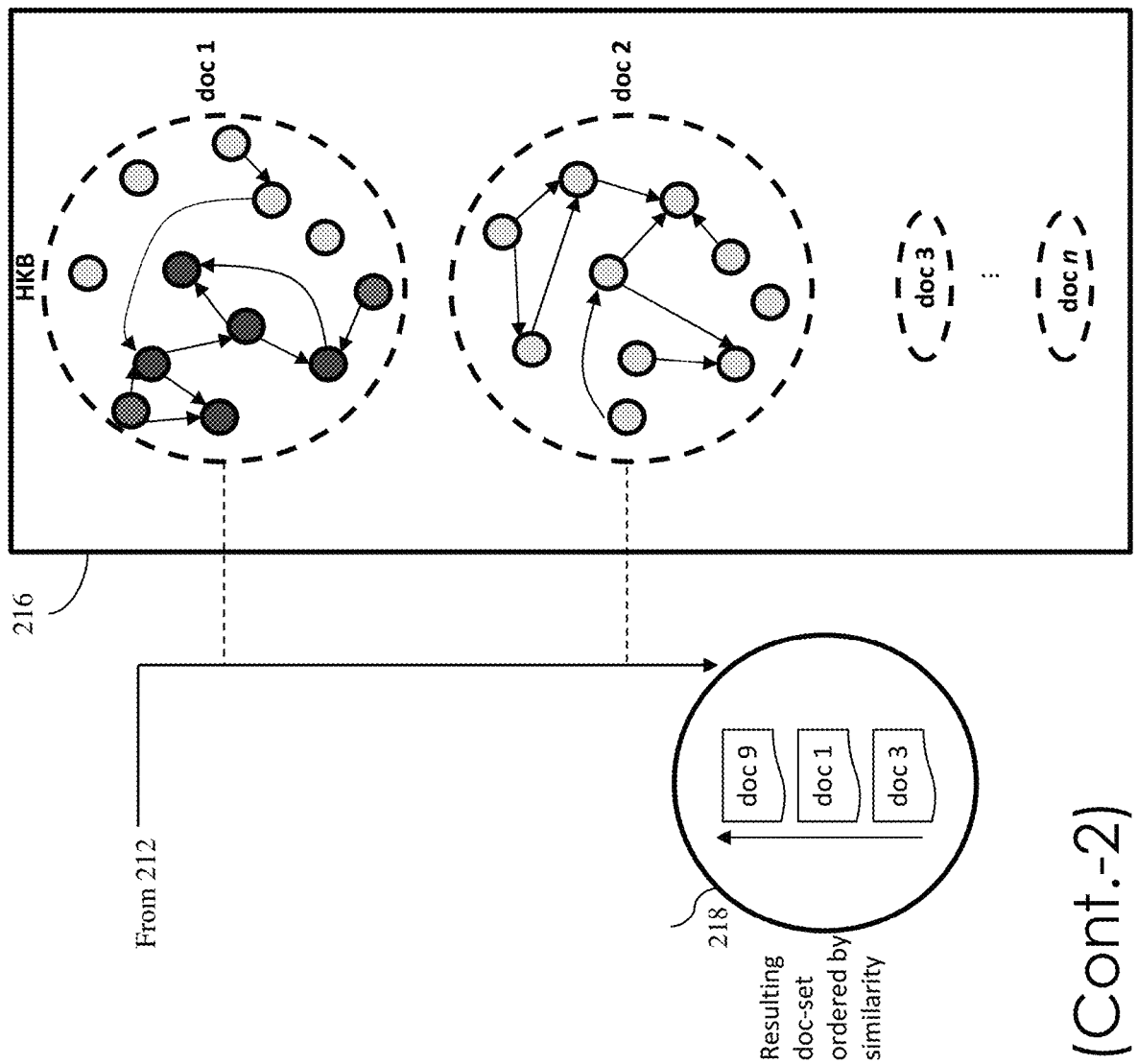
FIG. 2 (Cont.-2)

RETRIEVING DOCUMENTS ACCORDING TO TEMPORAL SIMILARITY

BACKGROUND

The present application relates generally to computers and computer applications, machine learning, natural language processing and more particularly to search engines and processing and retrieving documents according to temporal similarity.

In many domains there is the need of searching for documents with a similar temporal structure while considering the context and specific elements of a given vocabulary. The current methods to address this kind of search are limited. For example, some focus on finding documents that mention the same keywords or concepts, ignoring any temporal information. Others compare timestamps and temporal relations but do not consider the general structure of the document or its concepts. Automatic methods, for example, those performed by one or more computer processors may encounter difficulties when analyzing similarity based on the unfolding of temporal events described in documents.

BRIEF SUMMARY

The summary of the disclosure is given to aid understanding of a computer system and method of retrieving documents according to temporal similarity, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects. Advantageously, systems and/or methods described here can be used to find documents with a similar temporal structure while considering the context and specific elements of a given vocabulary (ontology) in a domain.

A system, in an aspect, can include a processor and a memory device coupled with the processor. The processor can be configured to receive a document. The processor can also be configured to extract entities and temporal information associated with the entities from the document using natural language processing. The processor can also be configured to create a graph structure representing the document's temporal semantics, where nodes of the graph structure include the entities and edges of the graph structure represent temporal relationships between the nodes. The processor can also be configured to link the graph structure with the document, where multiple documents are received and the processor is configured to create a knowledgebase, which includes multiple graph structures representing the multiple documents according to the multiple documents' temporal semantics.

In another aspect, a system can include a processor and a memory device coupled with the processor. The processor can be configured to receive an input document for query. The processor can also be configured to transform the input document into a graph structure for query, the graph structure for query representing the input document's temporal semantics, where nodes of the graph structure include the entities and edges of the graph structure represent temporal relationships between the nodes. The processor can also be configured to search a knowledgebase for a matching document having a graph structure similar to the graph structure for query based on a similarity threshold. The processor can also be configured to output the matching document.

A computer-implemented method, in an aspect, can include receiving a document. The method can also include extracting entities and temporal information associated with the entities from the document using natural language processing. The method can also include creating a graph structure representing the document's temporal semantics, where nodes of the graph structure include the entities and edges of the graph structure represent temporal relationships between the nodes. The method can also include linking the graph structure with the document, where multiple documents are received and the processor is configured to create a knowledgebase, which includes multiple graph structures representing the multiple documents according to the multiple documents' temporal semantics.

In another aspect, a computer-implemented method can include receiving an input document for query. The method can also include transforming the input document into a graph structure for query, the graph structure for query representing the input document's temporal semantics, where nodes of the graph structure include the entities and edges of the graph structure represent temporal relationships between the nodes. The method can also include searching the knowledgebase for a matching document having a graph structure similar to the graph structure for query based on a similarity threshold. The method can also include outputting the matching document.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An artificial intelligence system and method thereof can be provided, which can automatically identify contextualized temporal information in a document and use such information to retrieve documents with a similar temporal structure from a document base. The AI system can automatically identify and support curation of contextualized temporal information in a given document and can retrieve one or more documents with a similar temporal structure.

Components of the system, for instance, can be implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

For instance, the system can provide a knowledge-centric solution to retrieve documents according to temporal similarity. In an embodiment, the system can automatically process an input document extracting contextualized temporal events according to a given ontology. The system can also automatically structure and compose the extracted temporal events in hierarchical contexts stored in a knowledge graph according to a given ontology. The system can further match and retrieve documents with a similar temporal structure considering the temporal relations and concepts of interest selected, e.g., by a user.

An embodiment of the system and/or the method can include performing structured-document search in desired domains, for example, but not limited to, law and regulations. Search engines performing searches based on keywords and concepts can benefit from using the system and/or the method.

Figure 1:
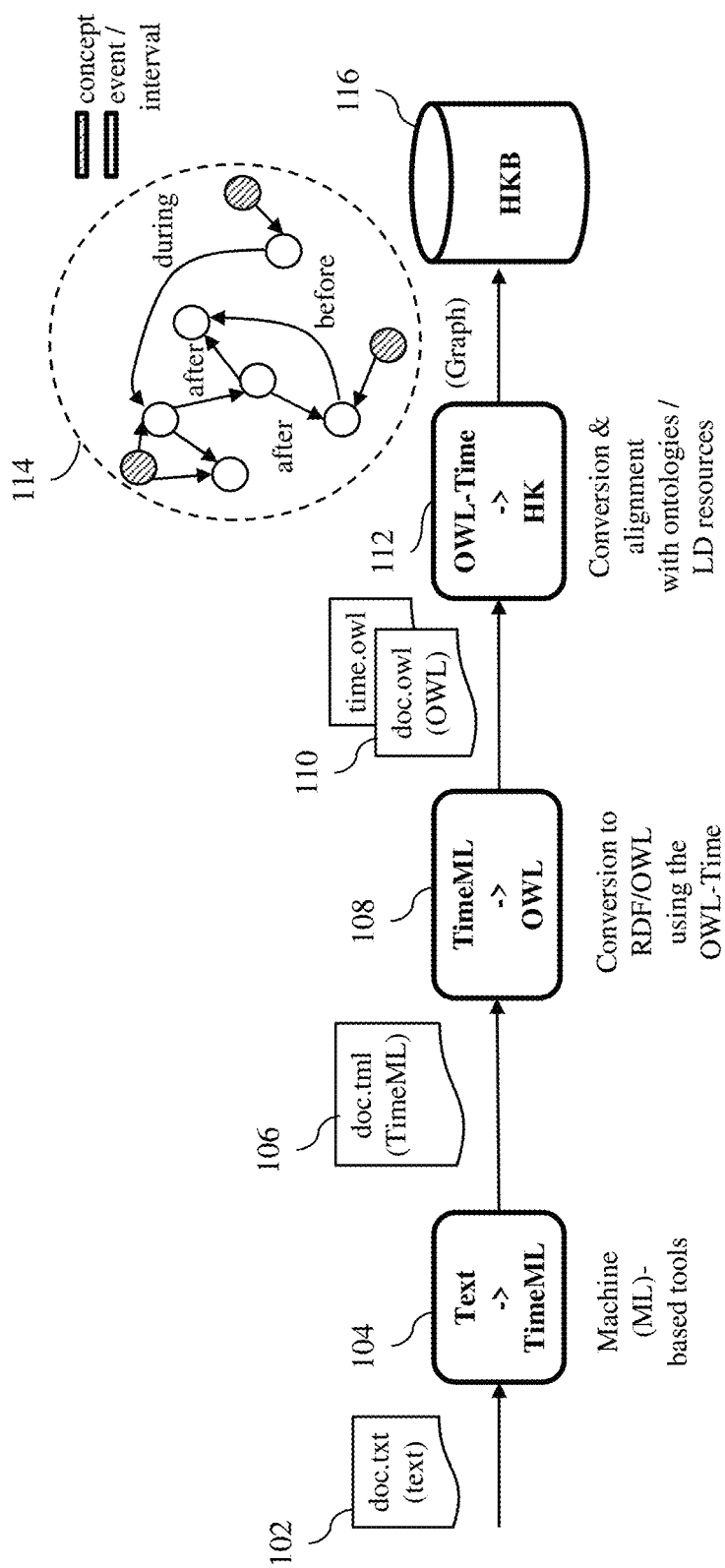
FIG. 1 is a diagram illustrating a pipeline of document ingestion processing in an embodiment.
Figure 1:
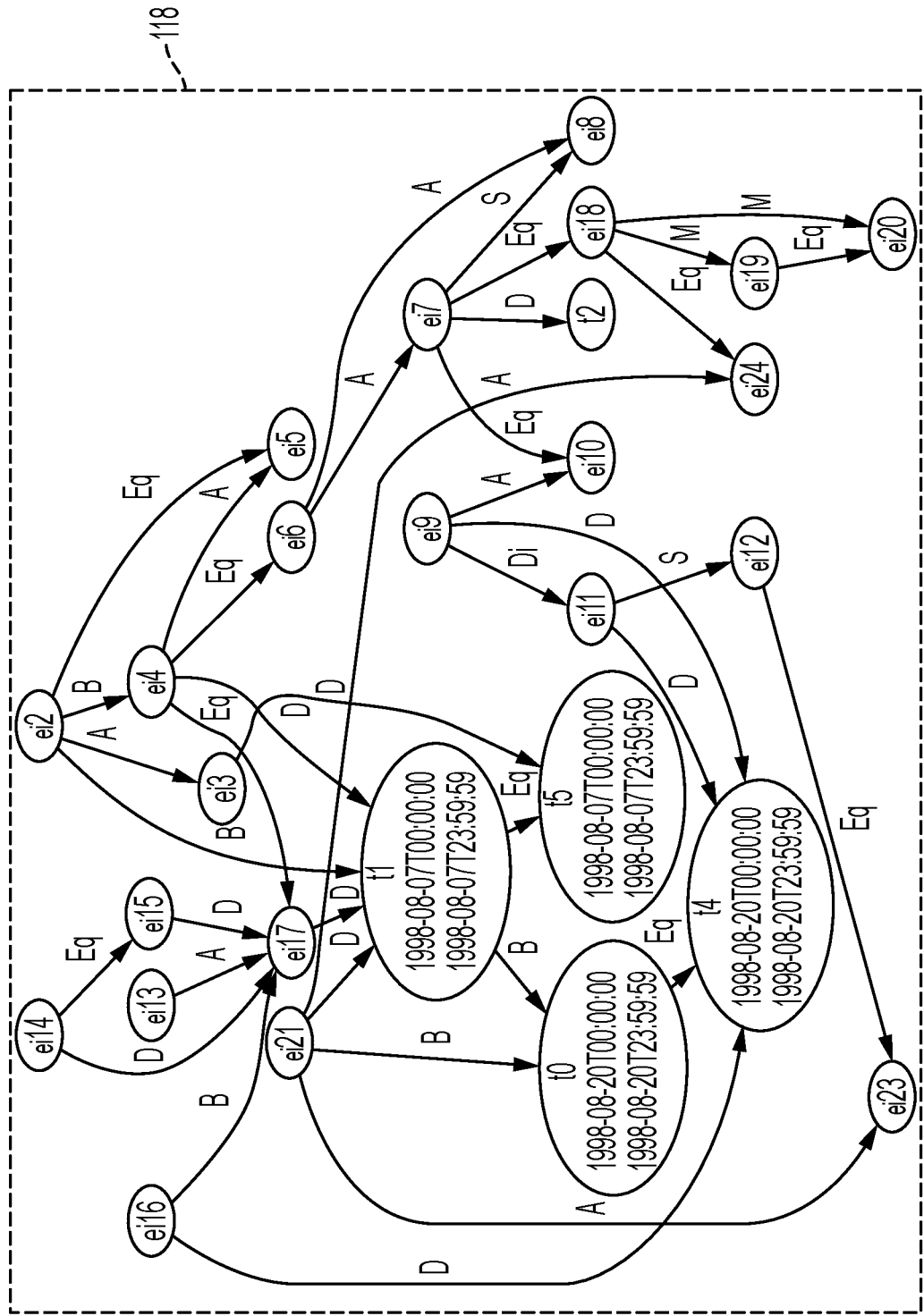

In an embodiment, the system and/or method can include document ingestion processing and search processing. FIG. 1 is a diagram illustrating a pipeline of document ingestion processing in an embodiment. Document ingestion includes transforming information from a document (e.g., unstructured document) into a structured knowledge graph. By analyzing the content of the document (e.g., texts, images, videos, audio), the system can identify events in the document and relevant temporal relationships among these events. For example, the system can identify from the text of the document, keywords or phrases describing events (e.g., actions or action words) and keywords or phrases describing temporal relations between two events or between an event and a time expression (e.g., event A occurred after time T1, event B occurred during event A, and so on). The keywords denoting events and associated temporal information can be analyzed to create structured representations of the document's content. In addition, the classes of events (e.g., an action word is a verb) and vocabulary associated with the temporal relations and time expressions ("before" is a transitive relation, Friday is a day of the week) can be represented in a structured form as knowledge graph based on existing or previously loaded ontologies, which formalize the available concepts and relations. Document ingestion transforms information extracted from the document to a knowledge graph, which can be stored in a database.

Referring to FIG. 1, a document 102 can be received. While the example shown refers to a text document, the method can also work with other multimedia documents such as audio, video, and/or others. For instance, an audio document can be converted into text by speech-to-text techniques and processed as described herein. The document 102 may contain unstructured text (e.g., in natural language form), for example, describing an event, such as a news article, publication, social media article, and the like. An example text can be (e.g., content of 102): "Country X had the right to defend its citizens against dangerous actions, Country Y said Friday in response to the Country X's attacks on alleged sites in Country A and Country B . . . ".

The document 102 is converted at 104 into a structured format 106 associating events with time or temporal attributes and associating events with other events temporally. Analytical tools, machine learning and natural language processing tools, available for analyzing and processing text into such format can be utilized. Example tools may include, but not limited to, those that include machine learning and natural language processing components to extract information from text, which associate events to times or to other events temporally; those providing library functions or machine learning models for finding natural language expressions of dates and times and converting them to a normalized form; those providing library function for recognizing and normalizing time expressions; and those providing library functions or machine learning models for finding qualitative temporal relations between temporal entities. In the example shown, a tool that adopts the TimeML format is used to extract temporal information. TimeML, developed in part in Brandeis University, Massachusetts, provides a standard markup language for temporal events in a document. For example, using TimeML, event markup, including time stamping (with which an event is anchored to a time), ordering events with respect to one another, reasoning with contextually underspecified temporal expressions, and reasoning about the length of events and their outcomes can be performed. The following illustrates an example of converted structured form, e.g., resulting content of 106: "Country X had the right to defend(e2) its citizens against dangerous actions(e3), Country Y said(e4) Friday (t1) in response to the Country X's attacks(e5) on alleged sites in Country A and Country B . . . ", where some of the temporal information extracted can be as follows: "(t1) simultaneous (t5); (t1) before (t0); (t0) simultaneous (t4); (e2) before (0); (e2) during (t5); (e2) after (e3) . . . "

The temporal format 106 can further be converted or transformed at 108 to ontology form 110, e.g., web ontology language (OWL) or another semantic web standard or schema such as Resource Description Framework (RDF) or the like. Other schemas can be used. By way of example, OWL-Time, ontology of temporal concepts, for describing the temporal properties of entities can be used.

The following shows an example conversion, e.g., resulting content of 110:

```
@prefix time: <http://www.w3.org/2006/time#> .
...
doc:ei16 a tml:EventOccurrence ;
tml:content "taken" ;
tml:context ""Countries have the right to ... {{taken}} ..." ;
tml:fromDocument ex:APW19980820.1428 ;
tml:tense "PRESENT" ;
time:hasTime doc:ei16_time .
...
doc:ei4_time a time:ProperInterval ;
time:intervalAfter doc:ei5_time ;
time:intervalDuring doc:t1_time ;
time:intervalEquals doc:ei17_time,
  doc:ei6_time .
```

OWL is a standard ontology language which can be used to describe knowledge in the form of ontologies. The ontology format 110 can be converted and aligned with other ontologies or linked data (LD) resources at 112. Ontologies specify the definitions of terms by describing their relationships with other terms in the ontology. For example, in the Hyperknowledge (HK) representation a graph data structure 114, can be built based on the ontology format 110. The built graph 114 is stored in a Hyperknowledge base or database (HKB) 116. An example data structure format of the graph data structure 114 is shown at 118 (in FIG. 1 (Cont.)). The nodes shown at 118 include event instance nodes (designated by ei*) representing events and time nodes (designated by t*) representing time or temporal information. The edges shown at 118 represent temporal relationships between nodes. "A" indicates "after"; "B" indicates "before"; "D" indicates "during"; "S" indicates "simultaneous"; and "Eq" indicates "equal". Other temporal designations can be used. These particular temporal relationships and the reasoning methods associated to descriptions that use them are part of the Interval Algebra, a formalism for qualitative temporal reasoning.

The methodology described with reference to FIG. 1 can create a structured database of graphs, for example, in a format that is searchable, for example, which can be used by search engines and the like, for example, for searching for documents having similar temporal semantics. The created graph structure can be made into a standard format, for example, integrating a plurality of documents in disparate formats, and provide a practical application for performing searches.

Figure 2:
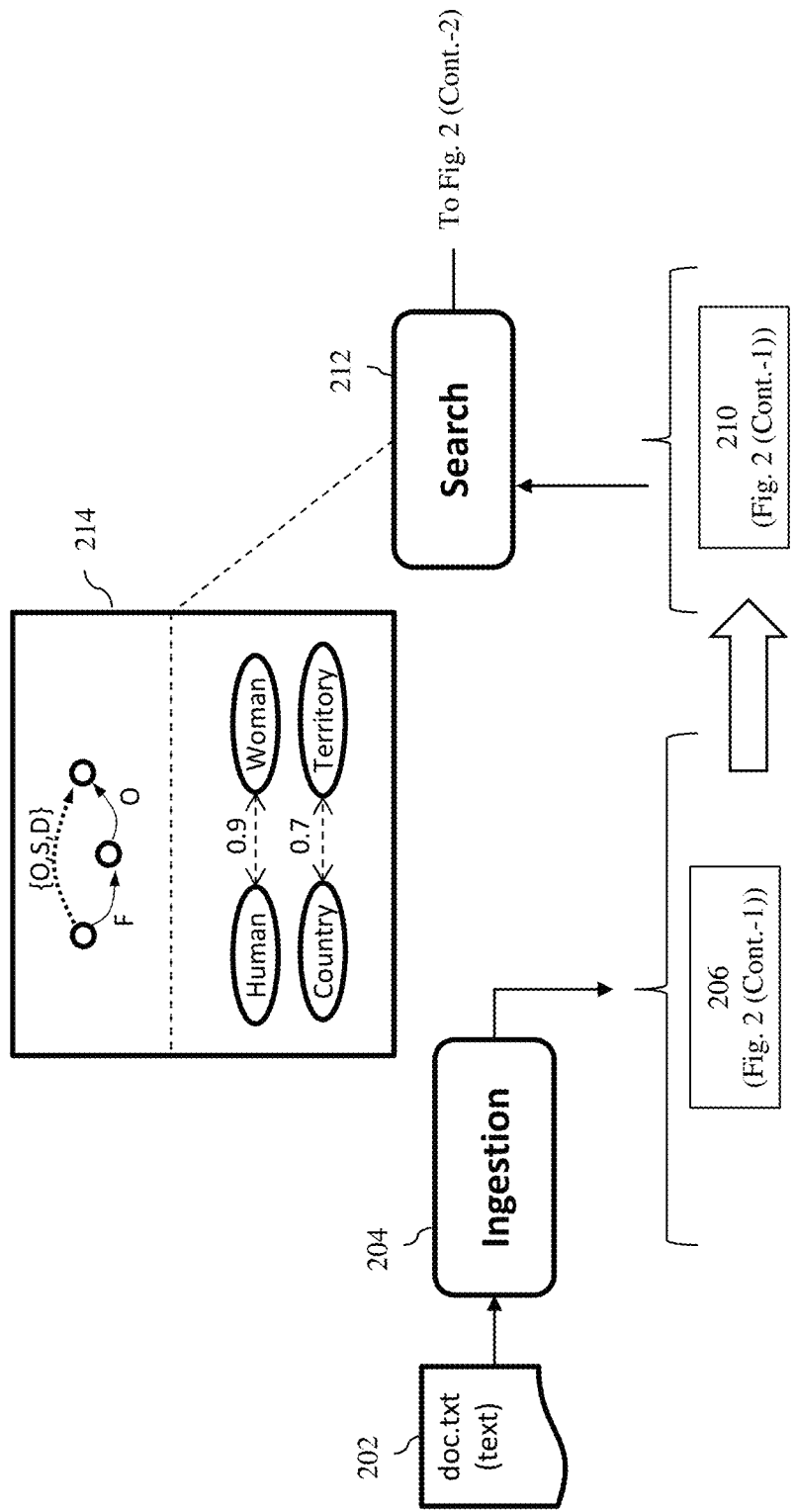
FIG. 2 is a diagram illustrating temporal similarity search in an embodiment.

FIG. 2 is a diagram illustrating similarity search in an embodiment. One or more computer processors may perform or implement such similarity search in an embodiment. For instance, a search engine running on a computer processor may perform a search. A document 202 is received. A user, for example, may specify a document, from which the user may request to find similar documents, for example, other documents having similar events in similar temporal turn of events. At 204, a processor may automatically inject the document and convert it into a graph data structure or form, which relates events in terms of time. The processor may employ the techniques described herein with reference to FIG. 1, for example. An example graph structure that is created is shown at 206.

The graph structure 206 can be presented to the user, from which the user may select a fragment of the graph 208. User may select a subgraph 208 containing events, intervals, and concepts of interest, with possible variable parts (shown or designated as "?"). A user selected subgraph with possible variable parts is shown at 210. Such selected subgraph is used as a search "term" or query, for searching a knowledge base (HKB) 216 (e.g., also, FIG. 1, 114). At 212, the processor performs a search on the HKB 216. The processor selects documents in the HKB 216 that contain a subgraph matching the input subgraph (query) considering the inferred temporal relations and entity similarity measure. Similarity can be measured based on a threshold matching, e.g., entity 1 matches 90% with entity 2. Shown at 214 is an example of similarity matching. For instance, a node in a subgraph can represent the term or concept "human". The term "woman" can match 90% with the term "human". Similarly, a node in a subgraph can represent the term or concept "country". The term "territory" can match 70% with the term "country." "O" refers to overlaps, "S" refers to starts, "D" refers to during, "F" refers to finishes. In an embodiment some of these temporal notations are inferred given the current set of temporal relations in the knowledgebase (KB). These specific relations are part of the Interval Algebra, a formalism for reasoning qualitatively about time and temporal relations. The Interval Algebra formalism is used here as an example. Other similar formalisms can used, such as point algebra, the INDU calculus, and/or others. The search of the HKB 216 including graph data structure of events or entities related by qualitative temporal relations can find resulting documents 218 that match the input document 202. The resulting documents 218 can be output, for example, presented to the user. The resulting set of documents can be ordered by similarity. For instance, if more than one matching document is found, the matched documents can be presented in a list sorted according to the degree of similarity.

Figure 7:
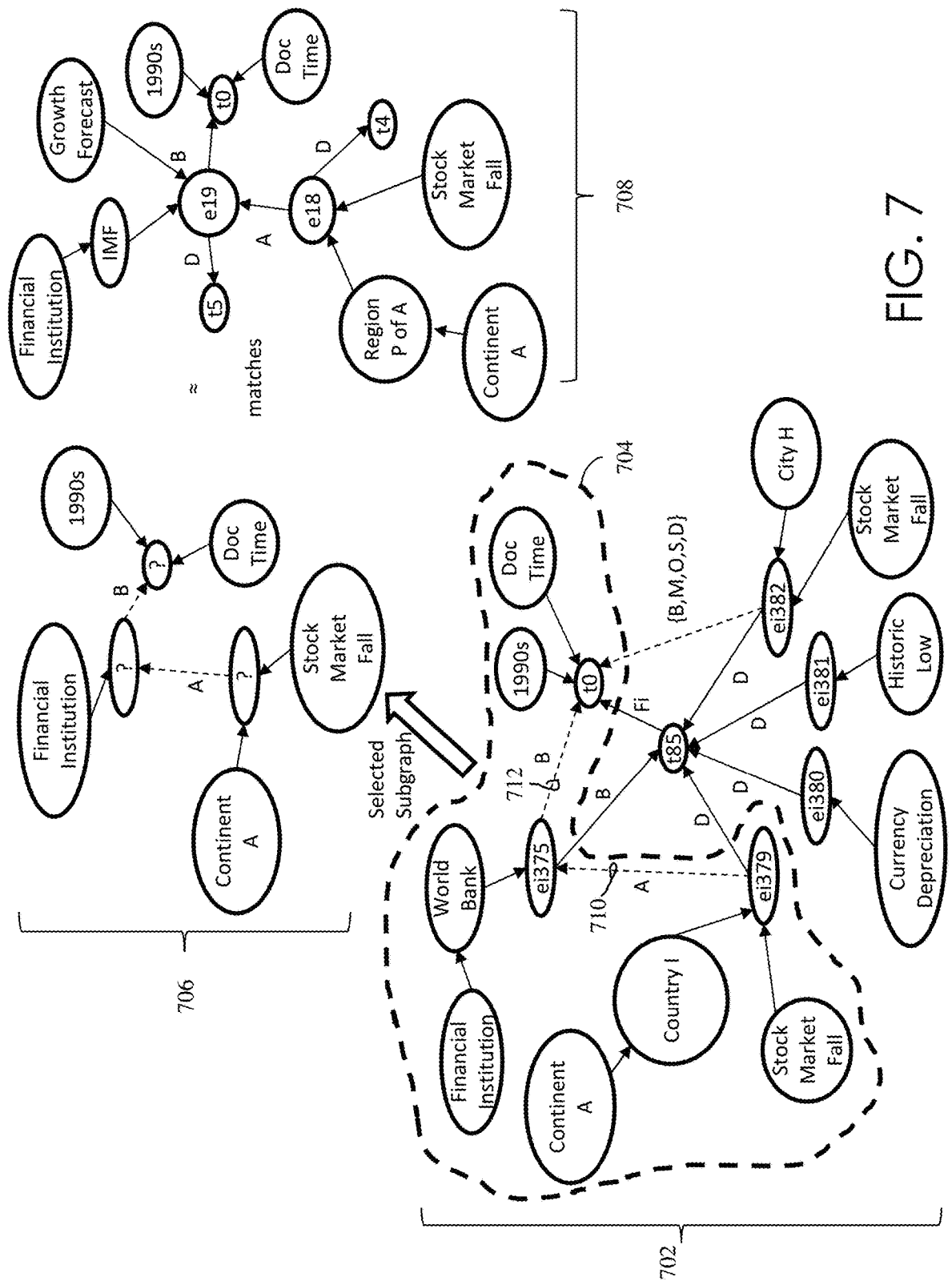
FIG. 7 illustrates an example of document ingestion and query in an embodiment.

FIG. 7 illustrates an example of document ingestion and query in an embodiment. For instance, a user may input the document, querying for similar documents that describe similar chronological order of similar events. By way of example, consider that the document contains the following text: "After financial help from the World Bank was refused (ei375), in the last 24 hours(t85), the value of the Country I's stock market has fallen(ei379) by 12%. The Country I's currency has lost(ei380) 26% of its value. In Country S, stocks hit(ei381) a 5 year(t86) low. In Country P, a 4 year(t87) low. And in City H, a 3% drop(ei382) . . . ". The document is formatted to have temporal structure such as follows: "ei375-B→t85; ei377-B→ei378; ei380-D→t85; ei379-D→t85; ei381-D→t85; ei382-D→t85; t85-Fi→t0; . . . ". "B" represents "before"; "D" represents "during".

The document is transformed into a structured graph format with nodes (events or entities) having temporal relationships, e.g., as shown at 702. That graph can be used as a query term or query structure for searching for or finding similar documents (e.g., with similar graph structure) in a knowledge base. In an embodiment, in addition to creating the graph with temporal relationships based on the analyzed content, additional temporal relationships can be inferred based on the text and/or the created graph. For instance, due to the properties of the temporal relations that occur in the graph, the system and/or method may automatically infer that a certain time point or interval represented by a node must occur "after" another time point or interval represented by another node. For example, as shown at 710, because ei375 occurred before (B) t85 the system can infer that t85 occurred after (A) ei375, since "after" is the converse of "before" (the dashed arrow denote inferred relations). Also, from the latter fact and because ei379 occurred during (D) t85 the system can conclude that ei379 occurred after ei375 (this follows from the composition of the temporal relations during and after, that is, if X occurred during Y and Y is after Z then X is after Z) Another inferred relationship is shown at 712.

A user can select a fragment of the graph 702, for example, as shown at 704. For instance, a graphical user interface can be provided, which allows the user to interactively select, for example, draw on the graph using an input device, a fragment 702. In an embodiment, the user may also modify or input variations of the nodes, e.g., using a "?" or another symbol to indicate that there can be a variation in the concepts or terms being matched. The user may modify the query graph in other way, for example, changing temporal relationships. A query graph is shown at 706.

Using the query graph 706, the system and/or method searches the knowledge base for matching or similar documents (e.g., documents having graph structure with temporal relationships that match the query graph 706). In an embodiment, the matching need not be exact 100% match, rather a threshold of matching can be performed.

By way of example, equivalent or similar document having following text can be produced as a search result: "Shares in major Continent A-Region P's markets declined (e18) on Thursday(t4), as the International Monetary Fund on Wednesday(t5) downgraded(e19) its growth forecast for Continent A's Region P . . . ". That resulting document may have a temporal structure format as follows, e.g., shown at 708: "e18-D→t4; t4-A→t5; e19-D→t5; e18-A→e19; e19-B→t0; . . . ". "A" represent "after".

The following illustrates examples of use cases. In a first example scenario, a team of geoscientists is developing a new exploration project. The system disclosed herein in an embodiment receives data from a user (e.g., geoscientist, a team member or another) associated with the current and past geoscience exploration projects. The system records and structures in a knowledgebase the received data, for example, the system can reason about this data.

For instance, Expert 1 creates a document with information about the new project. Expert 2 inputs the geographic locations and initial environment characteristics of the new project. These information or data are submitted to the system, and the system receives the data and runs or performs the knowledge structuring process. Additional data can be submitted. For instance, consequently, the geoscientists can submit further data about the project. For example, Expert 1 inputs the geological characterization based on the literature that describes near locations. Expert 2 inputs early gathered information and carries a stratigraphic analysis to determine the type of depositional environment. Such information is again submitted to the system, and the system runs the knowledge structuring process.

The team requests a temporal similarity search considering a specific set of documents from the current project. The system runs a similarity search against the previous projects in the knowledgebase and returns as a result a set of similar documents. The team uses a dashboard graphical user interface (GUI) to refine their search, selecting the concepts and relations that interest them in the search graph.

The system uses the input search graph to refine the result set of documents considering, for instance, those documents with temporal graphs which are included in the search graph. The new result set is presented to the team and can be analyzed by the team which finds a problematic past project that unfolded similarly and had a faulty depositional environment assessment. Throughout this process the system learns with user interaction and stores the intermediate search graphs and refined version of temporal structure for the document query.

Another example use case scenario include a search of structured multimedia documents. In this example, application developers are writing a structured multimedia document and want to search for similar multimedia documents in the company document pool. They have an example document which they submit to the system. The system receives the document and runs the knowledge structuring process to process the document. The processed document can be saved in a knowledgebase. The system also runs or conducts a temporal similarity search against a document pool in the knowledgebase, returning a set of similar multimedia documents. The developers may analyze the result and identify repeated structures (code) that occur in the document pool and decide to move these codes to a common code area or separate library. Throughout this process the system learns with user interaction and stores the search graphs.

Yet another example use case scenario is described with respect to aviation accident reports. In this example case, investigators would like to search for similar accident reports considering specific periods of the maintenance of an aircraft and its most recent flights. The investigators submit logs of a given aircraft, and may select the relevant parts to their search. The system runs the knowledge structuring process to process the new report or the logs. For example, the system processes the uploaded reports extracting their concepts and general temporal structure and compares the parts selected by the investigators to other reports in the pool, e.g., performs the similarity search against reports in the knowledgebase. The system presents the similar results found. Analyzing the results, the investigators may find a set of related accidents that contained similar sequence of failures under similar conditions. For instance, the investigators may identify a set of related accidents involving a similar sequence of failures under similar weather conditions. Throughout this process the system learns with user interaction and stores the search graphs.

Figure 3:
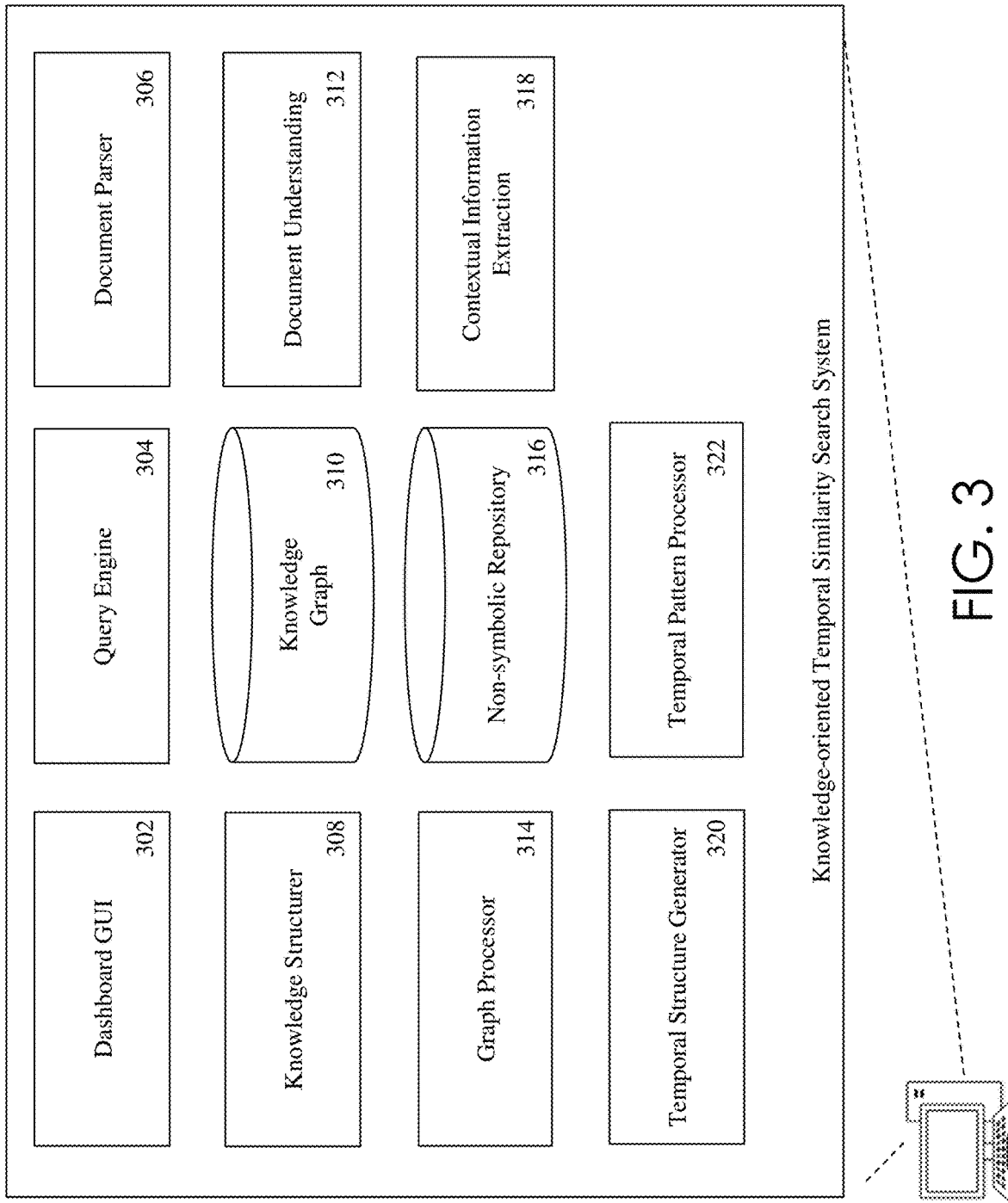
FIG. 3 is a diagram illustrating components of a knowledge-oriented temporal similarity search system in an embodiment.

FIG. 3 is a diagram illustrating components of a knowledge-oriented temporal similarity search system in an embodiment. The components can be computer-implemented components, computer programs or modules, running on a computer processor including a hardware processor. Dashboard graphical user interface (GUI) 302 can include a user interface or graphical user interface, which allows for interaction between a machine (computer) and a user. A user can input information, which the computer can receive and process, and the computer can output information to the user via the dashboard GUI 302. Information such as documents for ingestion, search graphs can be input by the user via the dashboard GUI 302. The dashboard GUI 302 can output knowledge graphs or fragments of knowledge graphs associated with a document. The dashboard GUI 302 can also allow the users to interact with the system, for example, allow the users to select fragments of a knowledge graph, for example, by drawing around the graph via the dashboard GUI 302, to input or specify a search feature or query.

Document parser 306 parses the document, for example, using a natural language technique, and extracts keywords relating to events and/or actions and temporal terms. Document understanding 312 can use a natural language technique or another technique to analyze the document, for example, according to their semantics.

Knowledge structurer 308 structures events and temporal relations into graph format, for example, builds a knowledge graph of the events and temporal relations and stores the graph in a knowledge graph database 310 or repository.

There can be a knowledge graph associated with a document, which can represent structurally (e.g., as structured data) the events and temporal relations among the events described in the document. In an embodiment, the document can be a text document, image document, video document, speech document, other multimedia document. Document processing such as speech to text techniques can be used to convert or transform such multimedia documents into structured events and temporal relations.

Contextual information extraction 318 relates events or keywords identified in the document to their context, for example, using existing ontologies that relates concepts to objects. For instance, a keyword "world bank" can be related to a concept "financial institution", which can be found via an ontology. Briefly, ontology provides a set of concepts and their properties and relations, for example, in a domain. The knowledge graph having events and temporal relations can also have contextual information. For instance, an event node can be linked to a node representing its context. For instance, a keyword node "world bank" can be linked to a "financial institution" with an edge that represents a relationship "type of".

Graph processor 314 can include graph processing functions or library functions that handle graph processing, e.g., adding node, modifying nodes, adding edges, modifying edges, and/or others.

Non-symbolic repository 316 stores documents, for example, whose corresponding knowledge graphs are stored in the knowledge graph knowledgebase 310. A knowledge graph in the knowledgebase 310 can have a link or reference to a document or portions of the document, which are stored in the non-symbolic repository 316.

Temporal structure generator 320 structures temporal part of the graph, builds edges between nodes in the graph, the edges represent qualitative temporal relations such as "before", "after", "during" and/or other temporal properties.

Temporal pattern processor 322 can be a search engine, which searches for temporal patterns in a document, performing temporal reasoning. Temporal pattern processor 322 can use natural language processing techniques and ontologies describing the concept of time to reason about temporal relations between and/or among events described in a document.

Query engine 304 performs queries against the knowledge base with knowledge graphs 310. For instance, given a fragment or branch of knowledge graph, the query engine 304 may search for similar graphs in the knowledge base 310. Query engine 304 may use temporal pattern processor to search for graph structures with temporal relations.

Figure 4:
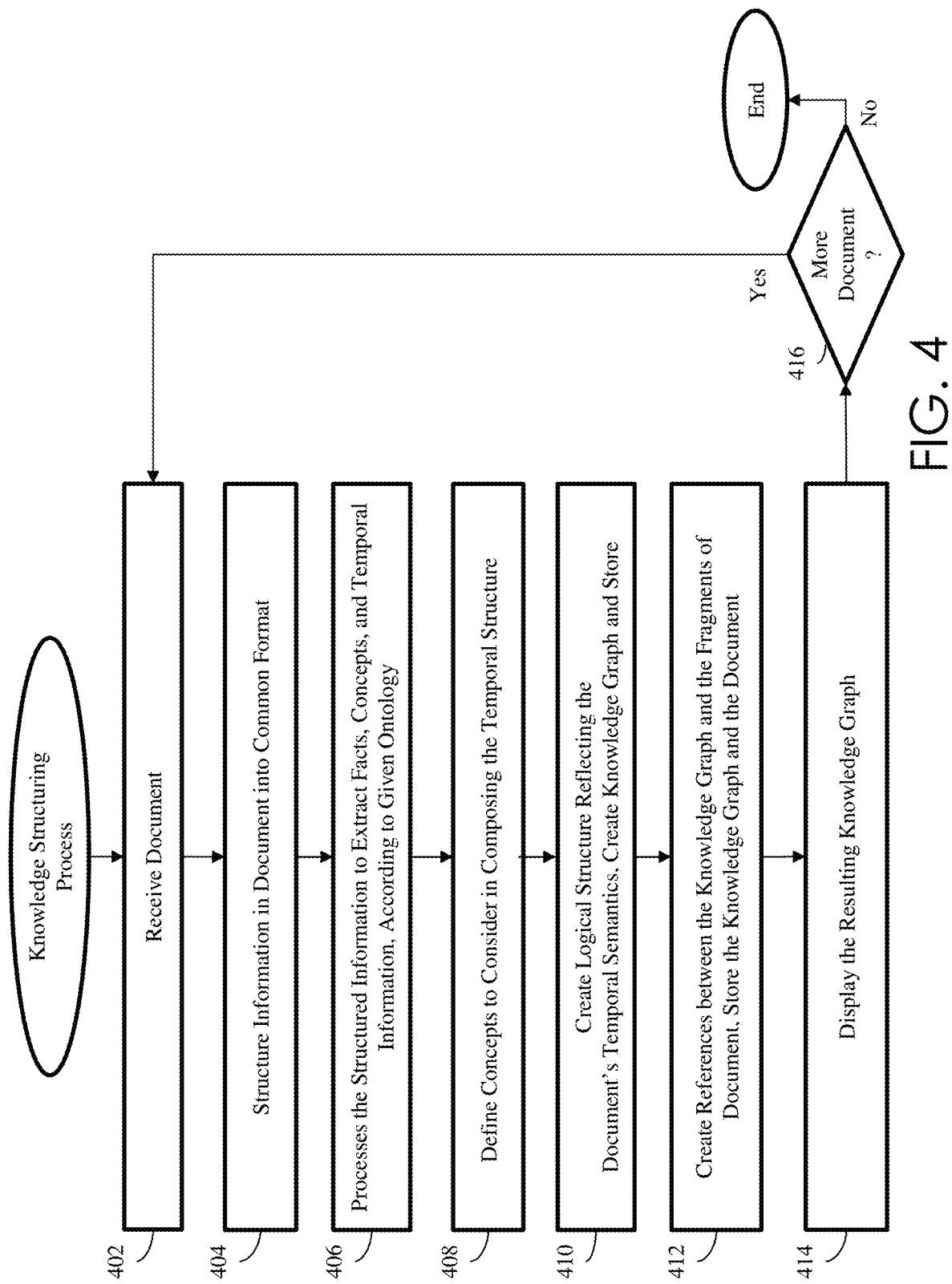
FIG. 4 is a flow diagram illustrating a method of ingesting a document and knowledge structuring in an embodiment.

FIG. 4 is a flow diagram illustrating a method of ingesting a document and knowledge structuring in an embodiment. One or more computer processor including a hardware processor can run the method. For example, a knowledge structurer (FIG. 3, 308) can perform the processing shown in FIG. 4, for example, in interaction with the rest of the components as described herein.

At 402, a processor receives a document. For example, a user may access the dashboard GUI (e.g., FIG. 3, 302) to inject a document. The document can include multimedia document, text document, audio document, and/or another document. For documents that include media such as audio, video, or another media, speech processing, image processing and/or another technique can be used to transform multimedia into text or object form, which can be parsed to extract keywords and temporal events.

At 404, the computer processor processes the injected document, structuring the information in a common format, for example, recognized standard format or structure format that is identifiable by a processor for processing. Examples of common format include, but is not limited to extended markup language (XML) or another format or data schema. For example, document parser (e.g., FIG. 3, 306) or a processor running such functionality can parse the injected or received document and transform the tokens in the document into a format.

At 406, the computer processor processes the structured information and extracts facts, concepts, and temporal information, according to a given ontology. For example, the document understanding component (e.g., FIG. 3, 312) processes the structured information to extract facts, concepts, and temporal information, according to a given ontology. A graph processor (e.g., FIG. 3, 314) may process the given ontology.

At 408, based on the ontology, the computer processor defines what concepts should be considered when composing the temporal structure. For example, the contextual information extraction (e.g., FIG. 3, 318) may define concepts to consider when composing the temporal structure, according to the given ontology.

At 410, the computer processor processes the extracted information to create a logical structure reflecting the document's temporal semantics. The logical structure is used to build a knowledge graph, which is stored. For example, the temporal structure generator (e.g., FIG. 3, 320) processes the extracted information to create a logical structure reflecting the document's temporal semantics. The logical structure is then passed to the knowledge structurer (e.g., FIG. 3 308), which creates a knowledge graph and stores it in the knowledge graph database (e.g., FIG. 3, 310).

At 412, the computer processor creates references or links between the knowledge graph that is stored and the fragments of document which was injected or received at 402. The computer processor can link actual words and sentences in the text to the nodes of the knowledge graph. Such links can be useful when showing the search result or matches in the original document format, for example, together with the knowledge graph. The knowledge graph database can store these references or links. Another database can store the injected or received documents. For example, knowledge structurer (e.g., FIG. 3, 308) creates references between the knowledge graph that is stored at 410 and the fragments of document that was injected at 402. These references are stored in the knowledge graph database (e.g., FIG. 3, 310) and the injected document is stored in the non-symbolic repository (e.g., FIG. 3, 316).

At 414, the computer processor outputs and/or causes the resulting knowledge graph to be displayed on a graphical user interface. The computer processor allows the user to align the knowledge graph with ontology, refine the knowledge graph, learning from the user interaction. For instance, the dashboard GUI (e.g., FIG. 3, 302) displays the resulting knowledge graph, enabling ontology alignment, user curation, and learning through user interaction. For instance, in an embodiment, through a visual interface on the dashboard GUI, users may create correspondences between concepts in different ontologies (alignment), e.g., "Olympics" in one ontology might correspond to "Olympic Games" in another. The users, via the dashboard GUI, may also correct or change entities and relationships in the knowledge graph (curation). The computer processor may automatically learn from such user interaction and may present, suggest and/or correct similar aspects from other parts of the knowledge graph.

At 416, if there are more documents to inject or process (e.g., user inputs more documents), the method flow proceeds to 402. Otherwise, the logic ends or returns to its caller. In this way, for example, a format of graph structure can be created that reflect temporal semantics of a document (e.g., free form document). Such format can be useful for performing searches on documents.

Figure 5:
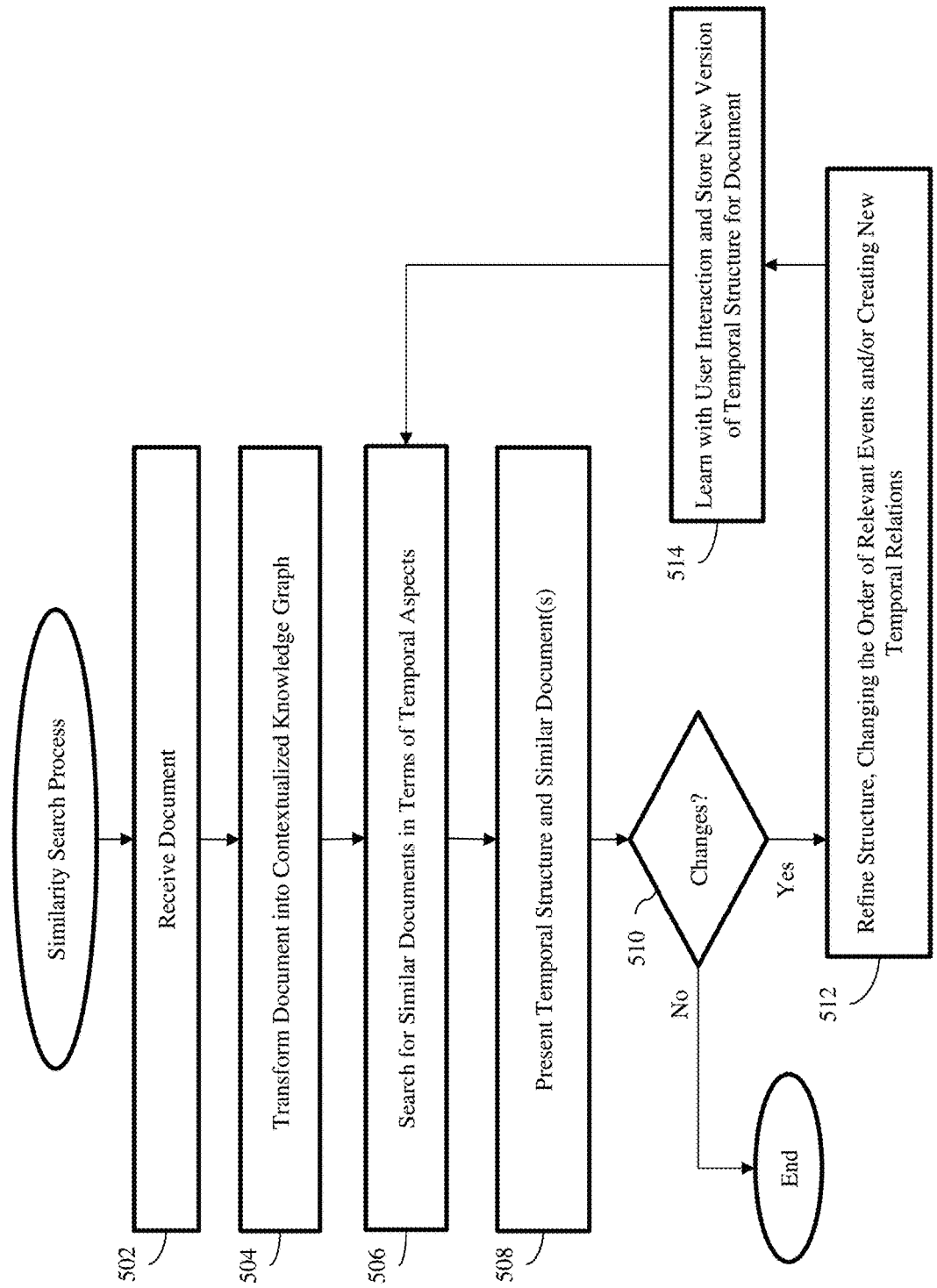
FIG. 5 is a flow diagram illustrating a method of similarity search in an embodiment.

FIG. 5 is a flow diagram illustrating a method of similarity search in an embodiment. The similarity search process or method can be run on one or more computer processors. At 502, a document to perform a similarity search is received. For instance, a user may access the dashboard GUI (FIG. 3, 302) to load a document to perform a similarity search, for example, to request to find a document having similar events and temporal relations as the input or loaded document.

At 504, the computer processor transforms the loaded or received document into a contextualized knowledge graph. For example, the loaded document is passed to the knowledge structuring process, for instance, described with reference to FIG. 4, which transforms the document into a contextualized knowledge graph.

At 506, the processor uses the knowledge graph generated at 504 to search for similar documents in terms of temporal aspects. For example, the processor compares the contextualized temporal graph structure of the received document with those stored in the knowledgebase. For example, the query engine (e.g., FIG. 3, 304) uses the graph generated by the process shown in FIG. 4, to search for similar documents in terms of temporal aspects. To do this, for instance, the query engine (e.g., FIG. 3, 304) the temporal pattern processor (e.g., FIG. 3, 322) to compare contextualized temporal structures and determine a set of similar documents.

At 508, the processor outputs or causes a graphical user interface to present or display the resulting temporal structure and similar documents. For example, the dashboard GUI (e.g., FIG. 3, 302) presents the temporal structure and similar documents.

At 510, it is determined whether there should be changes to the graph structure. For instance, the user may indicate to refine structure, change the order of relevant events and/or create new temporal relations.

At 512, if there are to be changes, user input is received with respect to refining structure, changing the order of relevant events and/or creating new temporal relations. For example, the user may use the dashboard GUI (e.g., FIG. 3, 302) to refine structure, changing the order of relevant events and/or creating new temporal relations. The processor receives such input and performs such refining of the structure. If there are no changes to be made to the structure, the process may end or return to its caller.

At 514, the processor learns with user interaction and stores the new version of temporal structure for the document, the knowledge graph entities representing the temporal structure of the document at 502, with any user corrections (curation). The processing may continue with the search at 506, using the new version of temporal structure.

Figure 6:
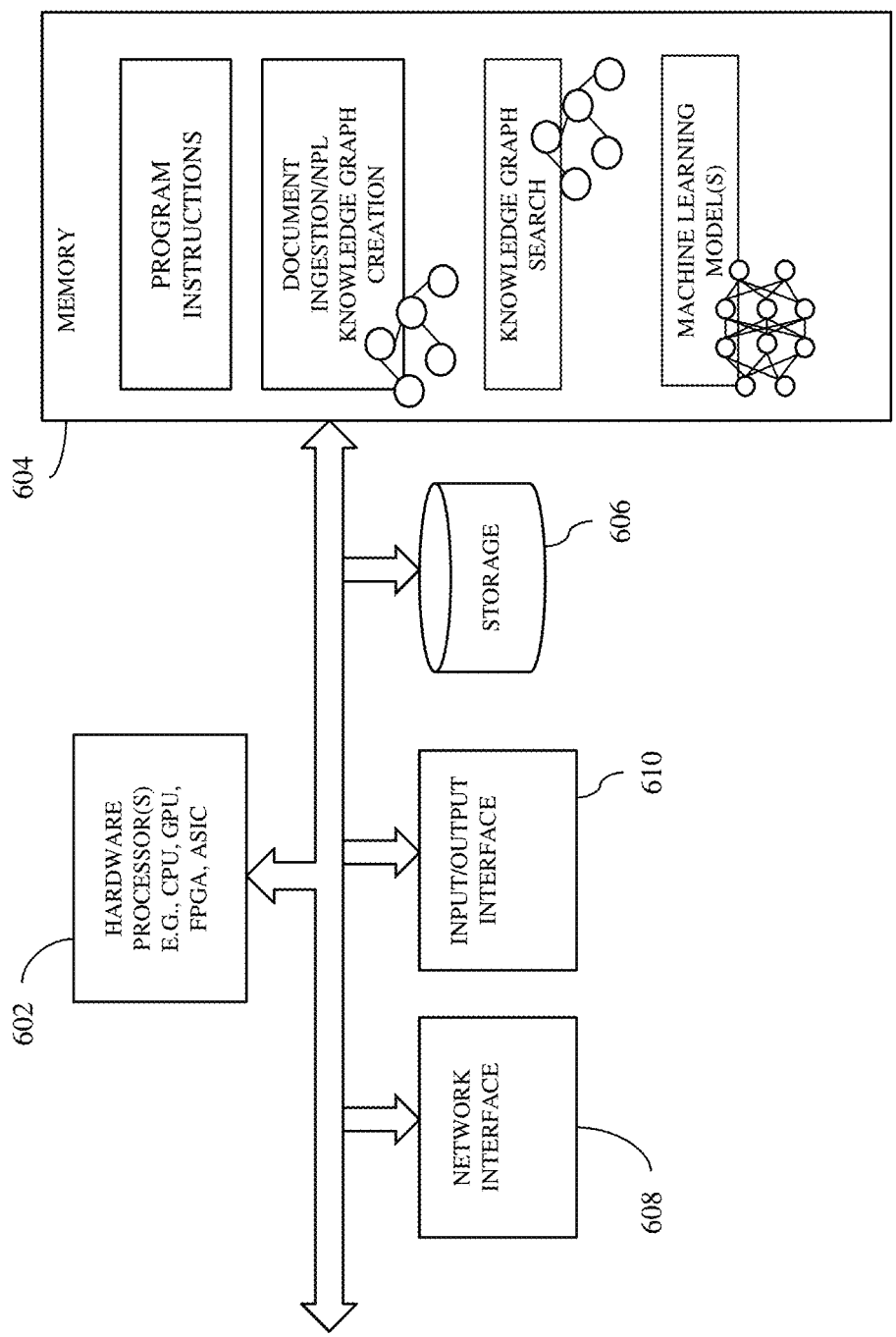
FIG. 6 is a diagram showing components of a system in one embodiment that can search and retrieve documents according to temporal similarity.

FIG. 6 is a diagram showing components of a system in one embodiment that can search and retrieve documents according to temporal similarity. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a knowledge base of graph structures, the graph structures representing documents according to temporal relationships of events described in the document. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including text documents and/or other media or multimedia documents. At least one hardware processor 602 may perform natural language processing to parse and analyze the data of the document and create a temporal structure of the events described in the data. At least on hardware processor 602 may also use a fragment of a graph as a query graph to search for similar documents. Data such as knowledge base of graph structures may be stored in a storage device 606 or received via a network interface 608 from a remote device, and may be temporarily loaded into a memory device 604 for searching. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 8:
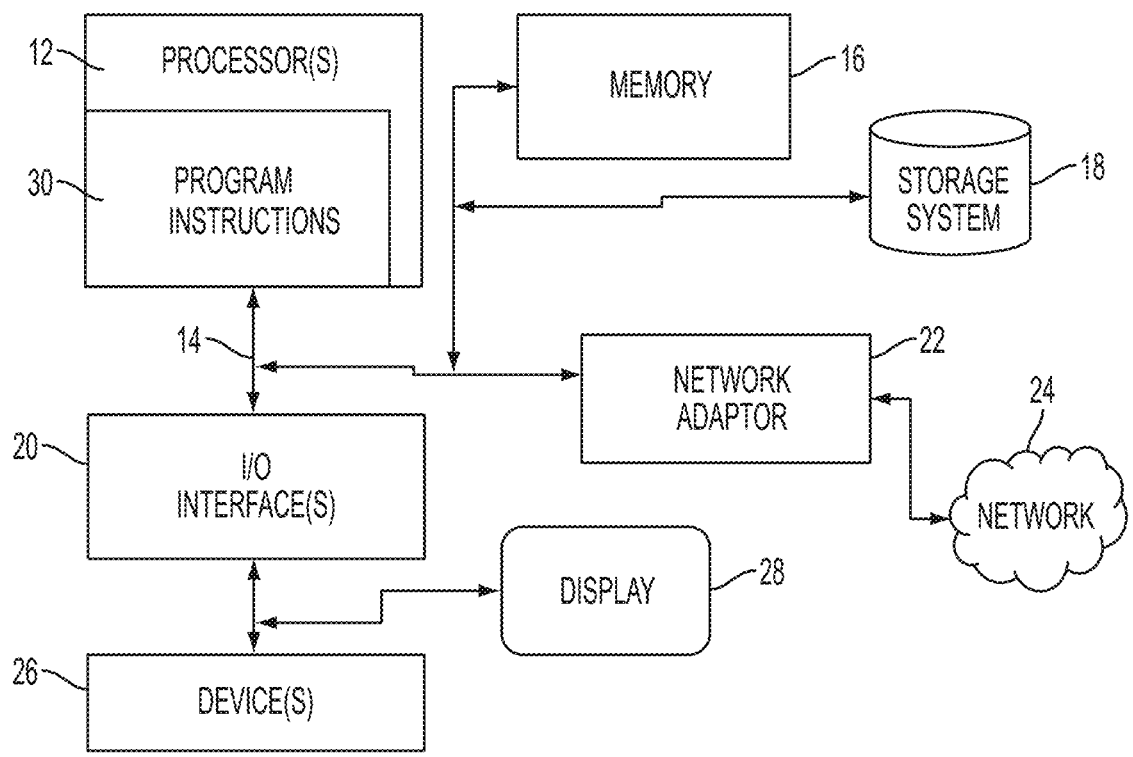
FIG. 8 illustrates a schematic of an example computer or processing system that may implement a system in one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
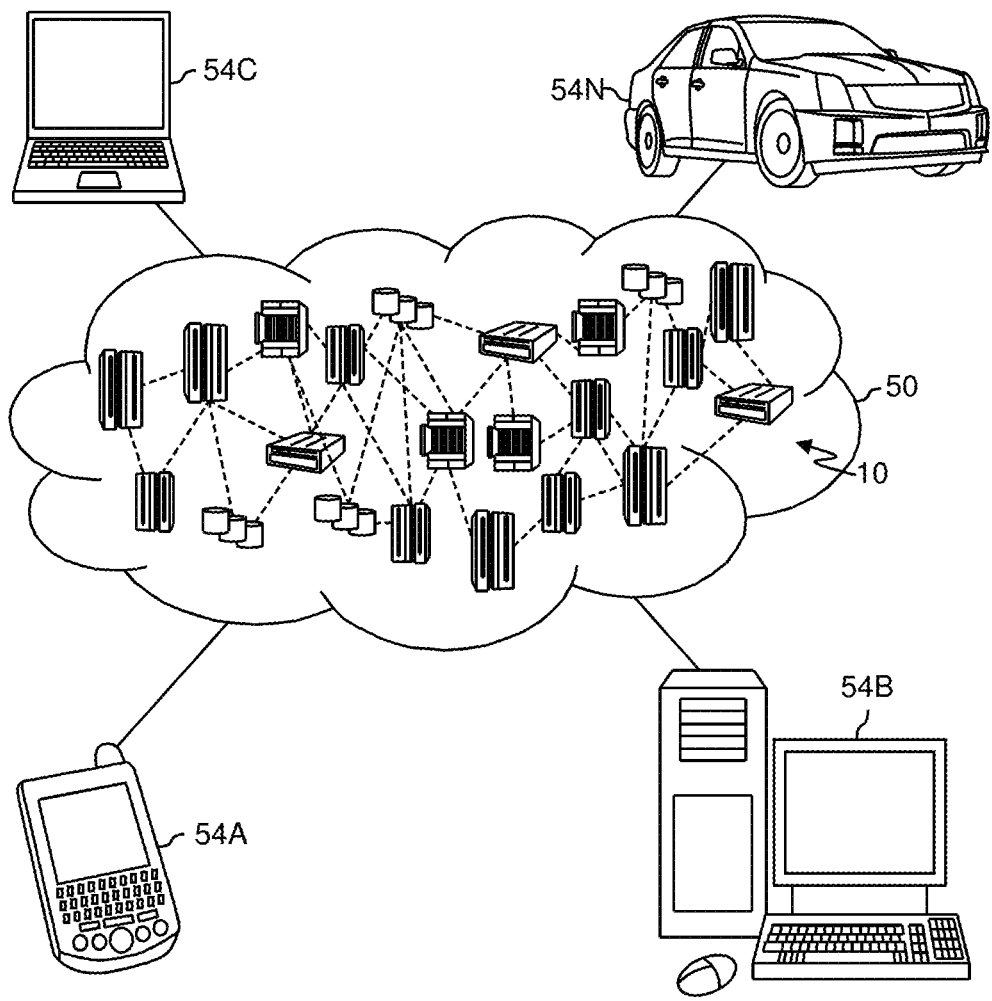
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
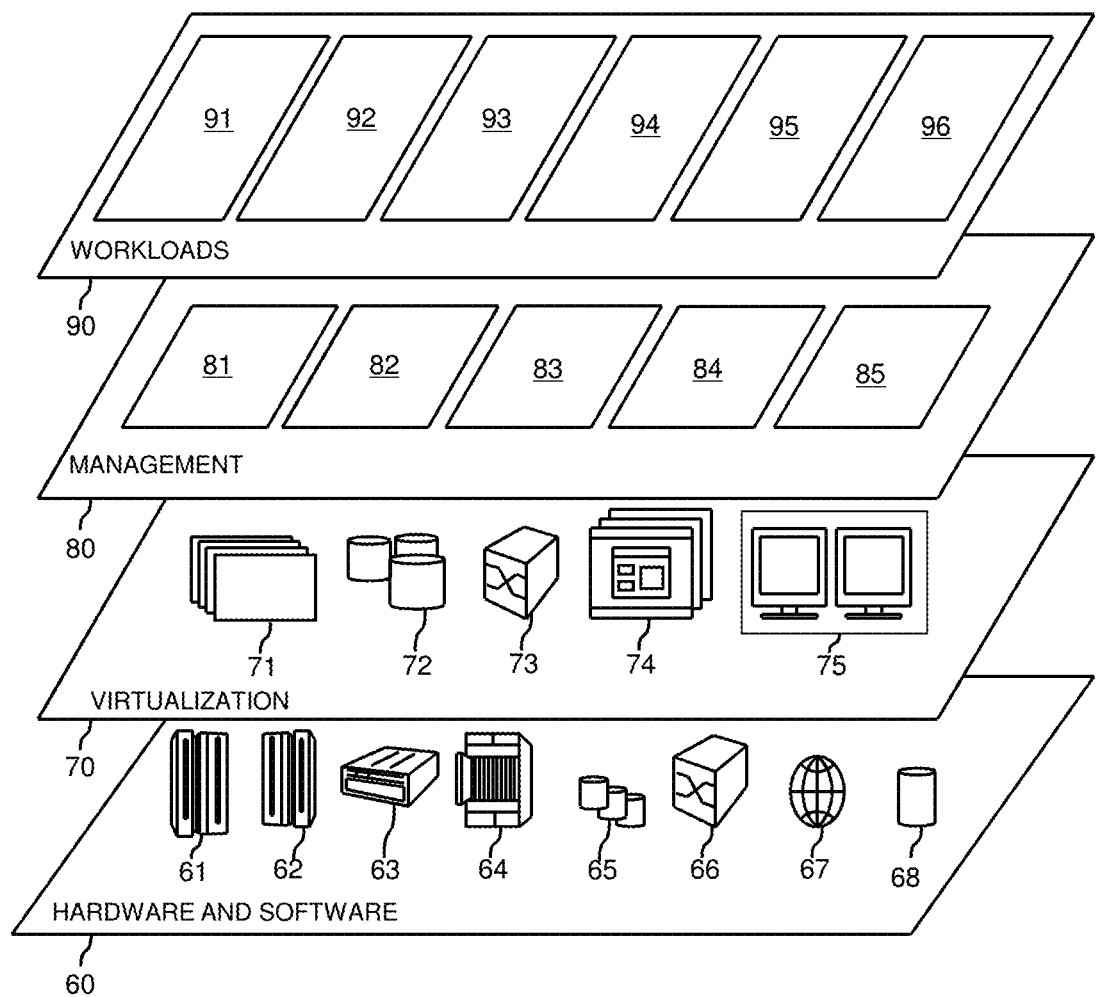
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing documents according to temporal semantics and retrieving documents according to temporal similarity 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A system comprising:
a processor;
a memory device coupled with the processor;
the processor configured to:
receive a document;
extract entities and temporal information associated with the entities from the document using natural language processing;

create a graph structure representing temporal semantics of the document, nodes of the graph structure including the entities and edges of the graph structure representing temporal relationships between the nodes;

link the graph structure with the document, wherein multiple documents are received, the processor configured to perform extracting of the entities, creating of the graph structure and linking of the graph structure for each of the multiple documents, and the processor is further configured to create a knowledgebase including multiple graph structures representing the multiple documents according to temporal semantics of the multiple documents, wherein the processor is further configured to:

receive an input document for query, the input document for query containing at least a plurality of words in natural language;

transform the input document into a graph structure for query, the graph structure for query representing temporal semantics of the input document;

search the knowledgebase for a matching document having a graph structure similar to the graph structure for query based on a similarity threshold; and output the matching document.

2. The system of claim 1, wherein the knowledgebase is stored in a first database and the multiple documents are stored in a second database, wherein the graph structures stored in the first database link to the multiple documents stored in the second database.

3. The system of claim 1, wherein the processor is further configured to store the graph structure for query in the knowledge base and link the graph structure for query to the input document.

4. The system of claim 1, wherein the processor is further configured to receive a fragment of the graph structure for query selected by a user, wherein the search is performed using the fragment of the graph structure for query.

5. The system of claim 1, wherein the processor is further configured to receive a fragment of the graph structure for query, which is further modified by the user, wherein the search is performed using the modified fragment of the graph structure for query.

6. The system of claim 1, wherein responsive to finding more than one matching document, the processor is further configured to order matching documents according to a degree of similarity and output the matching document in the order of similarity.

7. A computer-implemented method comprising:

receiving a document;

extracting entities and temporal information associated with the entities from the document using natural language processing;

creating a graph structure representing temporal semantics of the document, nodes of the graph structure including the entities and edges of the graph structure representing temporal relationships between the nodes;

linking the graph structure with the document, wherein multiple documents are received, wherein the extracting, the creating and the linking are performed for each of the multiple documents, and the method further includes creating a knowledgebase including multiple graph structures representing the multiple documents according to temporal semantics of the multiple documents, the method further including:

receiving an input document for query, the input document for query containing at least a plurality of words in natural language;

transforming the input document into a graph structure for query, the graph structure for query representing temporal semantics of the input document;

searching the knowledgebase for a matching document having a graph structure similar to the graph structure for query based on a similarity threshold; and outputting the matching document.

8. The computer-implemented method of claim 7, wherein the knowledgebase is stored in a first database and the multiple documents are stored in a second database, wherein the graph structures stored in the first database link to the multiple documents stored in the second database.

9. The computer-implemented method of claim 7, further including storing the graph structure for query in the knowledge base and linking the graph structure for query to the input document.

10. The computer-implemented method of claim 7, wherein a fragment of the graph structure for query selected by a user is received and wherein the searching is performed using the fragment of the graph structure for query.

11. The computer-implemented method of claim 7, wherein a fragment of the graph structure for query, which is further modified by the user, is received and wherein the searching is performed using the modified fragment of the graph structure for query.

12. The computer-implemented method of claim 7, wherein responsive to finding more than one matching document, ordering matching documents according to a degree of similarity and outputting the matching document in the order of similarity.

13. A computer program product comprising a computer readable storage medium having program instructions embodied therewith, the program instructions readable by a device to cause the device to:

receive a document;

extract entities and temporal information associated with the entities from the document using natural language processing;

create a graph structure representing temporal semantics of the document, nodes of the graph structure including the entities and edges of the graph structure representing temporal relationships between the nodes;

link the graph structure with the document, wherein multiple documents are received and the device is caused to create a knowledgebase including multiple graph structures representing the multiple documents according to temporal semantics of the multiple documents, wherein the device is further caused to:

receive an input document for query, the input document for query containing at least a plurality of words in natural language;

transform the input document into a graph structure for query, the graph structure for query representing temporal semantics of the input document;

search the knowledgebase for a matching document having a graph structure similar to the graph structure for query based on a similarity threshold; and output the matching document.

14. The computer program product of claim 13, wherein the knowledgebase is stored in a first database and multiple documents are stored in a second database, wherein the graph structures stored in the first database link to the multiple documents stored in the second database.

15. The computer program product of claim 13, wherein the device is further caused to store the graph structure for query in the knowledge base and link the graph structure for query to the input document.

16. The computer program product of claim 13, wherein the device is further caused to receive a fragment of the graph structure for query selected by a user, wherein the search is performed using the fragment of the graph structure for query.

17. The computer program product of claim 13, wherein the device is further caused to receive a fragment of the graph structure for query, which is further modified by the user, wherein the search is performed using the modified fragment of the graph structure for query.

18. The computer program product of claim 13, wherein responsive to finding more than one matching document, ordering matching documents according to a degree of similarity and outputting the matching document in the order of similarity.

* * * * *